United States Patent
Zriny et al.

(10) Patent No.: US 7,693,081 B1
(45) Date of Patent: Apr. 6, 2010

(54) INTEGRATED IP DSLAM TEST MONITOR

(75) Inventors: Donald P. Zriny, Lucas, TX (US); Frederick H. Skoog, Colleyville, TX (US); James Talley, Frisco, TX (US); Gerardo A. Gonzalez, Plano, TX (US)

(73) Assignee: Alcatel Lucent, Paris (FR)

( * ) Notice: Subject to any disclaimer, the term of this patent is extended or adjusted under 35 U.S.C. 154(b) by 772 days.

(21) Appl. No.: 11/427,076

(22) Filed: Jun. 28, 2006

(51) Int. Cl.
*H04L 1/00* (2006.01)
(52) U.S. Cl. ............ 370/242; 370/250; 370/252; 370/463; 714/732
(58) Field of Classification Search .......... 370/250; 714/732; 340/853.2
See application file for complete search history.

(56) References Cited

U.S. PATENT DOCUMENTS

| | | | |
|---|---|---|---|
| 4,194,113 A * | 3/1980 | Fulks et al. ........... | 714/732 |
| 7,099,852 B2 * | 8/2006 | Unsworth et al. ...... | 706/23 |
| 7,420,791 B1 * | 9/2008 | Dong et al. ........... | 361/90 |
| 2007/0283400 A1 * | 12/2007 | Lee et al. .............. | 725/107 |
| 2007/0283401 A1 * | 12/2007 | Lee et al. .............. | 725/107 |

\* cited by examiner

*Primary Examiner*—Chi H. Pham
*Assistant Examiner*—Shick Hom
(74) *Attorney, Agent, or Firm*—RG&Associates (57) ABSTRACT

A system, method, and computer readable medium for integrated IP DSLAM test monitor that comprises monitoring at least one data stream, collecting measurements of the at least one data stream, broadcasting the collected measurements to a remote monitoring station, analyzing the monitored at least one data stream by the remote monitoring station, identifying a fault signature from the analyzed at least one data stream, and sending an alert of the identified fault signature so that actions may be take to isolate and repair the fault.

20 Claims, 5 Drawing Sheets

INTEGRATED IP DSLAM TEST MONITOR

BACKGROUND OF THE INVENTION

The present invention is generally related to Internet Protocol Television (IPTV) Digital Subscriber Line Asynchronous Multiplexing (DSLAM) test monitoring, and more specifically to integrating the test monitoring within the IPTV architecture. IPTV denotes a system or architecture whereby a digital television service is delivered to a subscriber over a broadband connection provided by an IP DSLAM to the customer premise. This example uses a DSLAM, but any access node can be utilized.

Currently, end-user complaints are the first indication of a problem on the video service with an Internet Protocol (IP) Digital Subscriber Line Access Multiplexer (DSLAM). The feedback necessary to insure customer satisfaction is not at present an integral part of the system. Additionally, problem identification in an IPTV system requires the use of manual test equipment and isolation of various components of the network up to the Customer Premises Equipment (CPE). Such problem identification may require a technician to manually test the different points of interest within the IP DSLAM, or perform the tests while the IP DSLAM is out-of-service. It may require dismantling the IP DSLAM to individually test the boards and the interfaces between those boards. Additionally, testing in this way by removing the IP DSLAM from service does not allow testing under normal operating conditions. By not being able to test under normal operating conditions, several test scenarios and test stimulus would need to be carefully crafted to cover all possible conditions of a real-time network. Placing the IP DSLAM out-of-service would also be costly to the customer causing considerable downtime. This type of testing would involve manual troubleshooting and analysis as there currently is no solution for the network or CPE environment to provide information upstream to a management element, also referred to as a remote monitoring station. Existing solutions that isolate sections of a network cannot test the isolated section's interaction with the entire network. Taking equipment out of service for testing can be objectionable to the end user, especially in an IPTV network, where downtime is not acceptable.

Therefore, what is needed is a method and apparatus to gather statistics from within any portion of an IPTV data stream without interrupting the data stream and to report this information upstream.

SUMMARY OF THE INVENTION

The present invention adds testing clients consisting of a Versatile Sniffer (Vsniff) client, also referred to as the client, to various portions of the IP DSLAM, the home gateway and the Set Top Box (STB) to collect and process statistics on the received video data streams. By comparing the statistics of video traffic leaving the IP DSLAM at various points and entering the home gateway with those leaving the gateway and entering the STB, discrepancies in captured information can indicate where the problem resides. In addition, the potential problem can then be reported upstream to a remote monitoring station. Because only statistical information is exchanged between the CPE environment and the remote monitoring station, bandwidth requirements are low. The statistics gathered can be the types and sizes of video packets received at the CPE, as well as arrival times, sequence numbers, etc. A signaling mechanism may be used for the remote monitoring station to discover and identify Vsniff client compatible equipment with, for example, a Hello Message. Once the remote monitoring station has determined that Vsniff client compatible equipment is present, the remote monitoring station activates, interrogates, and deactivates the Vsniff clients. An optional Graphical User Interface (GUI) in the set top box can display gateway and STB statistics. Moreover, the GUI can, in addition to displaying statistics, control the Vsniff clients.

Looping back a copy of the received video stream for comparison would waste network bandwidth therefore only video stream statistics are captured. When Vsniff clients are placed in various points in the network, a technician or automated network management program can selectively monitor the entire network. Selected test results, either detailed information or generic status indicators, can be displayed using the STB GUI interface. Network operators can get early warnings of service degradation caused by errors in the access or CPE networks.

When the remote monitoring station asks the Vsniff clients at the home gateway and set top box to gather a count of the packets received on a particular stream, and if less packets arrive at the set-top-box (STB) than arrived at the home gateway, the remote monitoring station can conclude that a problem exists in either the gateway, the Ethernet to the STB, or in the STB itself. If needed, a technician can troubleshoot the problem using the STB GUI interface.

The present invention sends only statistics of the video stream as required and as a result, a burden is not placed on the network. A centralized remote monitoring station can activate, interrogate, and deactivate the Vsniff test clients. In the present invention each node in the network has the capability to gather statistics of a particular video stream and either send the information to the remote monitoring station, or to the STB for analysis which should not provide a processing or memory burden.

The present invention provides a flexible solution to remotely monitor and analyze multiple points of interest within the IP DSLAM for performance and fault detection that does not currently exist. Such a solution would reduce the cost by allowing the IP DSLAM to stay in service. This solution would additionally provide a mechanism to remotely identify a faulty board, subsystem or configuration, within the IP DSLAM, to then be repaired.

Vsniff (Versatile Sniffer) is a data traffic analyzer entity that sniffs Ethernet frames or proprietary data frames to gather statistics and measurements on any interested field in each frame. This entity is flexible such that it monitors one or multiple physical ports, and within each physical port has the capability to monitor multiple data streams. When analyzing multiple ports or multiple data streams, Vsniff has the capability to compare and correlate the results. Vsniff can be implemented in software, hardware, or as a hardware component Field Programmable Gate Array (FPGA)/Application Specific Integrated Circuit (ASIC). In any implementation this entity is configurable to support various data traffic types like video, audio, Voice Over Internet Protocol (VOIP), most TCP/IP protocols, and proprietary protocols. A Vsniff client would be one of a multiple of these entities dispersed at various locations to perform the functions in a coordinated effort. Each Vsniff client has the capability to communicate the statistical and measurement results to a remote monitoring station, which coordinates all of the results from multiple clients.

The present invention would require integrating, into the IP DSLAM, Vsniff clients at various key locations to monitor real-time data traffic at multiple points of interests that are essential to detecting faulty cards, components, subsystems, or configurations. The integrated Vsniff clients would provide a flexible solution to monitor and compare results between multiple interfaces, and multiple data streams within those interfaces in the IP DSLAM. The present invention would allow the IP DSLAM to stay in service in the IPTV network, thus providing testing under normal conditions, allowing its interaction with other elements in the network. The statistics and results generated by each client are then compacted into special data frames and sent to a remote monitoring station for further analysis and global monitoring. Control to configure the integrated clients to monitor points of interest would be provided by the remote monitoring station, or could be autonomous.

The present invention could be implemented in a variety of ways in the IP DSLAM. In the IP DSLAM the Vsniff clients could be implemented as a software module, hardware module (Daughter board) or as a hardware component (ASIC/FPGA). These clients could be placed in key locations within the IP DSLAM. At these key locations, the clients can monitor real-time traffic from a variety of interfaces such as the host uplink interfaces, expansion shelves interfaces, interfaces between network termination cards and line cards, and interfaces between the packet forwarding function of a Network Processor (NP) and Digital Subscriber Line (DSL) circuitry on the line cards. Comparison of data streams at these multiple interfaces provides internal mechanisms to monitor frame loss, compare bandwidth utilization, and provide additional measurements. The Vsniff clients would also have added flexibility to monitor and generate statistics on user specified fields, within interested data packets, at these interfaces. With this added flexibility proprietary or standard techniques using Real-Time Flow Measurement (RTFM) can be applied to monitoring video streams or other interested data streams within the IP DSLAM. The present invention analyzes the collected data and reports fault conditions when a fault event exceeds a predetermined threshold.

Control of the Vsniff clients and results from each Vsniff client are communicated via an Simple Network Message Protocol (SNMP) session or other proprietary sessions to a remote monitoring station. At the remote monitoring station clients can be configured to monitor specified fields within the data packet at specified interfaces in the IP DSLAM. Additionally the remote monitoring station organizes and presents results from the clients with graphical enhancements, therefore providing additional mechanisms for further processing, and providing more detailed measurements and analysis. These results are also coordinated and compared with other Vsniff clients from within the IP DSLAM. By using the coordinated results from the integrated clients, the central monitoring station could detect the location of the problem from within the IP DSLAM, within other IP DSLAMs in the IPTV network, or other network elements with similar capabilities.

This present invention utilizes flexible individual Vsniff clients that are dispersed at several key locations within the IP DSLAM. These clients are connected offline from the existing data paths within the IP DSLAM. Since the clients sniffs or listens at specified interfaces, no addition burden is placed on these interfaces that are being monitored. Since the Vsniff clients works on only the statistics, it does not place additional burden on the network while the test data is being sent to the central monitoring station.

In one embodiment of the present invention, a method of internet protocol digital subscriber line asynchronous multiplexer test monitoring that comprises monitoring at least one data stream, collecting measurements of the at least one data stream, broadcasting the collected measurements to a remote monitoring station, analyzing the monitored at least one data stream by the remote monitoring station, identifying a fault signature from the analyzed at least one data stream, and sending an alert of the identified fault signature. The method may also comprise calculating statistics from the at least one data stream, organizing the calculated statistics, summarizing the calculated statistics, compacting the calculated statistics, evaluating the at least one data stream, recognizing fault signatures in the at least one data stream, wherein the at least one data stream is monitored proximate at least one physical port.

In a further embodiment of the present invention, a computer readable medium that comprises instructions for, monitoring at least one data stream by at least one client, communicating between the at least one client and a remote monitoring station, analyzing the monitored at least one data stream by the remote monitoring station, and identifying a fault signature from the analyzed at least one data stream. The computer readable medium may also comprise instructions for ascertaining a fault location from the analyzed at least one data stream, controlling the at least one client, coordinating the at least one client, comparing the monitored at least one data stream, correlating the monitored at least one data stream, configuring the at least one client and dispersing the at least one client.

In yet a further embodiment, a system for internet protocol digital subscriber line asynchronous multiplexer test monitoring that comprises a processor for communicating with at least one client which is monitoring at least one data stream, analyzing the communications from the client, identifying fault signatures from the analyzed communications and ascertaining fault locations from the analyzed communications, and a memory for storing the monitoring from the at least one data stream. Wherein the processor may control the at least one client, configure the at least one client and disperse the at least one client.

DETAILED DESCRIPTION OF THE INVENTION

Figure 1:
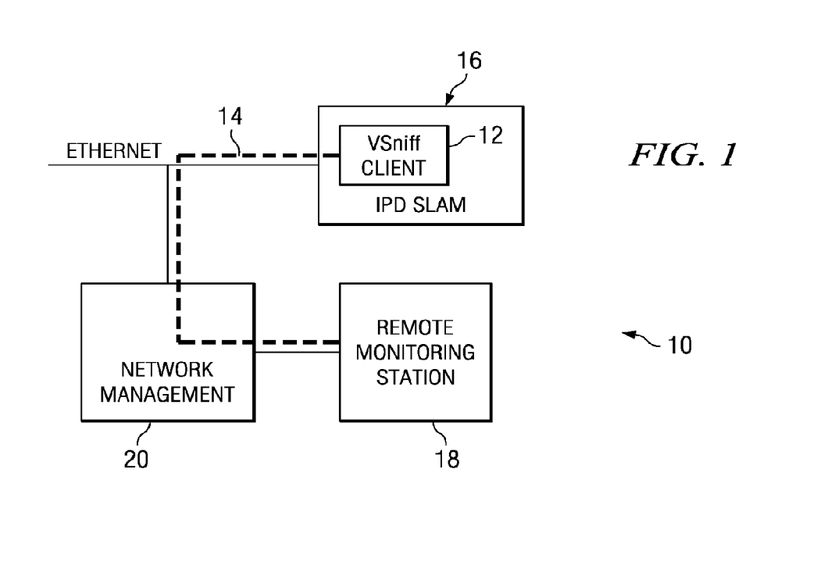
FIG. 1 depicts a first system in accordance with a preferred embodiment of the present invention.

Referring now to FIG. 1, depicts a first system for integrated IP DSLAM test monitoring 10 in accordance with the preferred embodiment of the invention. Control of the Vsniff clients 12 and results from each Vsniff client are communicated 14, as an example via an SNMP session from the IPTV DSLAM 16 to a remote monitoring station 18 through network management 20. At the remote monitoring station clients can be configured to monitor specified fields within the data packet at specified interfaces in the IP DSLAM. Additionally the remote monitoring station organizes and presents results from the clients with graphical enhancements, therefore providing additional mechanisms for further processing, and providing more detailed measurements and analysis. These results are also coordinated and compared with other Vsniff clients from within the IPDSLAM. By using the coordinated results from the integrated clients, the central monitoring station could detect the location of the problem from within the IPDSLAM, within other IP DSLAM sites in the IPTV network, or other network elements with similar capabilities. These modules or nodes may be connected by a variety of sources such as fiber, IP (IP backbone, VoIP network, etc.), wireless or twisted pairs. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

The IP DSLAM is connected to an optical network terminal carrying video, data and VoIP. The IP DSLAM is also connected to serving area interface carrying video, data and VoIP.

Figure 2:
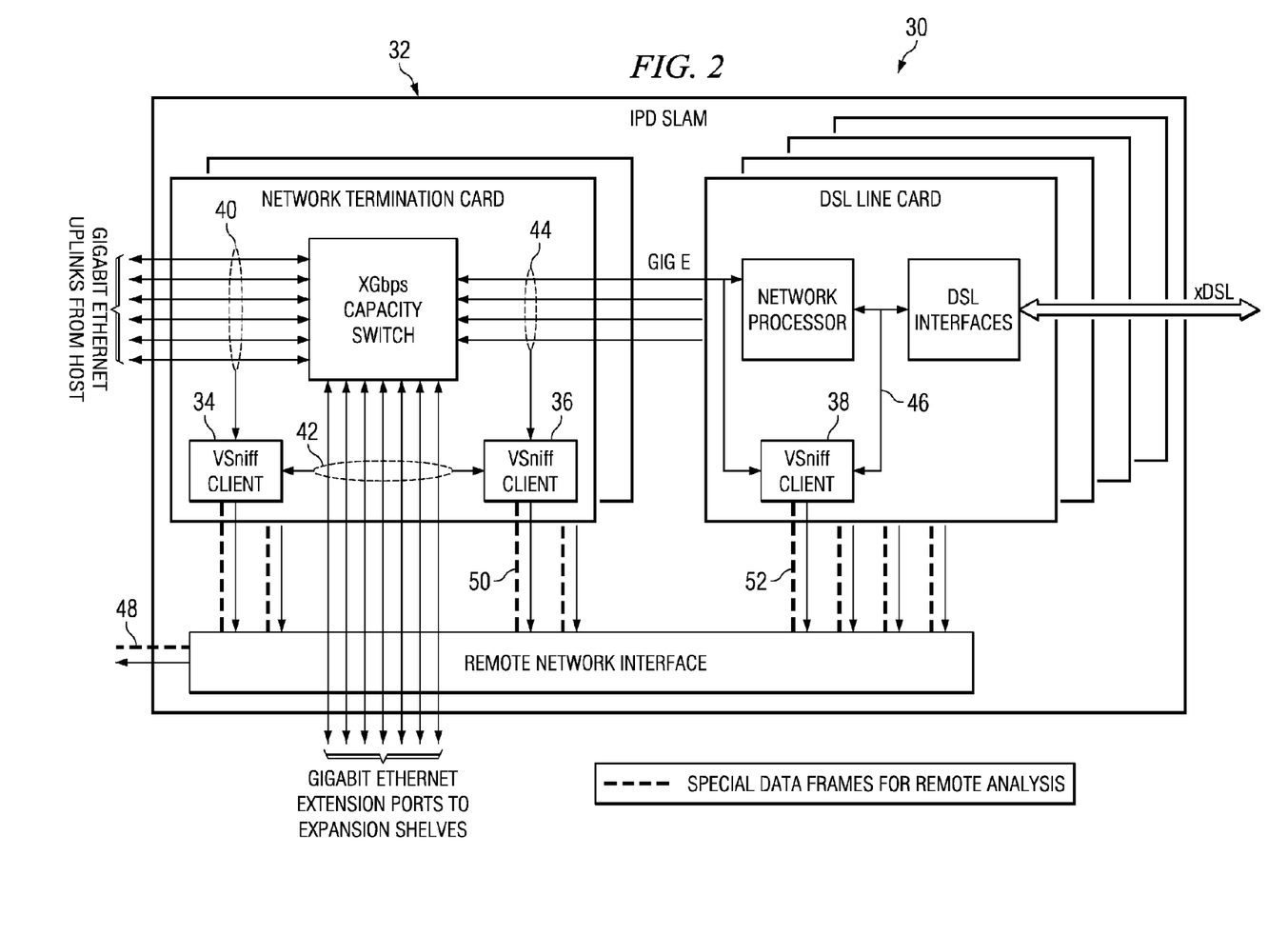
FIG. 2 depicts a second system in accordance with a preferred embodiment of the present invention.

Referring now to FIG. 2, depicts a second system for integrated IP DSLAM test monitoring 30 in accordance with the preferred embodiment of the invention. The present invention could be implemented in a variety of ways in the IP DSLAM 32. In the IP DSLAM the Vsniff clients 34, 36, 38 could be implemented as a software module, hardware module (Daughter board) or as a hardware component (ASIC/FPGA). These clients could be placed in key locations within the IP DSLAM. At these key locations, the clients can monitor real-time traffic from a variety of interfaces such as the host uplink interfaces 40, expansion shelves interfaces 42, network termination card and line card interfaces 44, and interfaces between NP and DSL circuitry on the line cards 46. The data streams are monitored and statistics are sent upstream to the remote monitoring station. Comparison of data streams at these multiple interfaces provides internal mechanisms to monitor frame loss, compare bandwidth utilization, and provide additional measurements. The Vsniff clients would also have the flexibility to monitor and generate statistics on user specified fields, within interested data packets, at these interfaces. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 3:
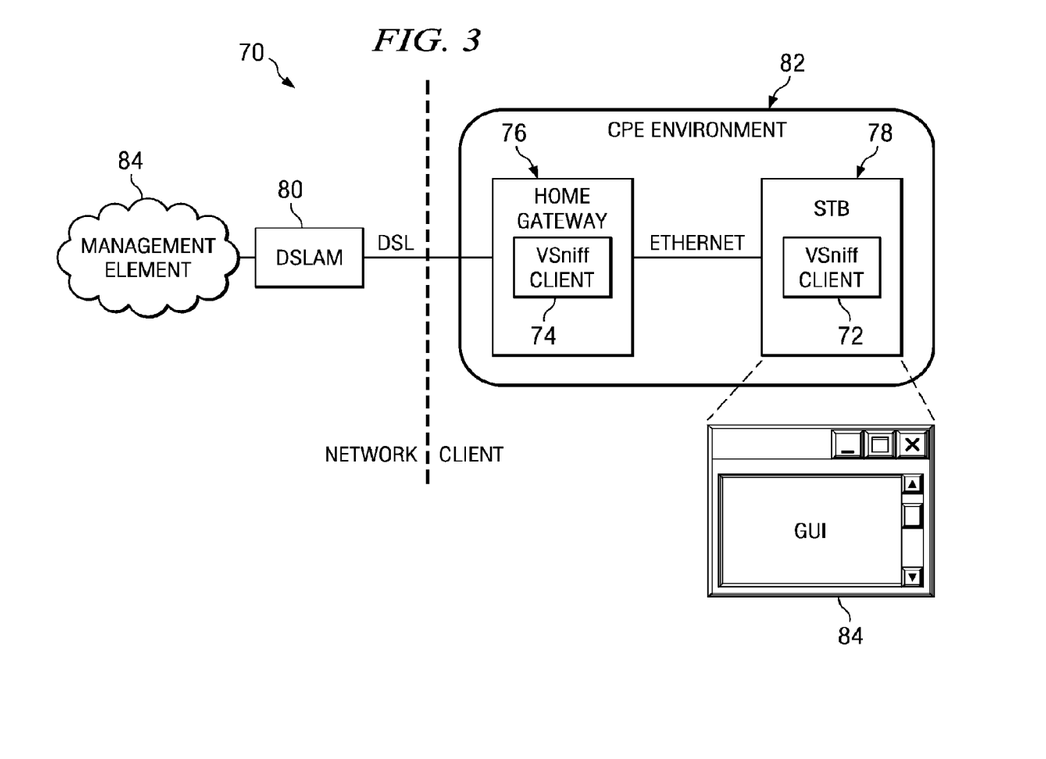
FIG. 3 depicts a third system in accordance with a preferred embodiment of the present invention.

Referring now to FIG. 3, depicts a third system for integrated IP DSLAM test monitoring 70 in accordance with the preferred embodiment of the invention. This embodiment of the invention consists of adding small Vsniff test clients 72, 74 to the home gateway 76 and the Set Top Box (STB) 78 to collect and process statistics on video data streams received from the IP DSLAM 80. By comparing the statistics of video traffic entering the home gateway with those leaving the gateway and entering the STB, discrepancies in captured information can indicate a potential problem in the Customer Premises Equipment (CPE) 82. Once a management element, alternately referred to as a remote monitoring station 84 has determined that Vsniff equipment is present, the remote monitoring station activates, interrogates, and deactivates the Vsniff clients. An optional GUI interface 84 in the set top box can display gateway and STB statistics. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 4:
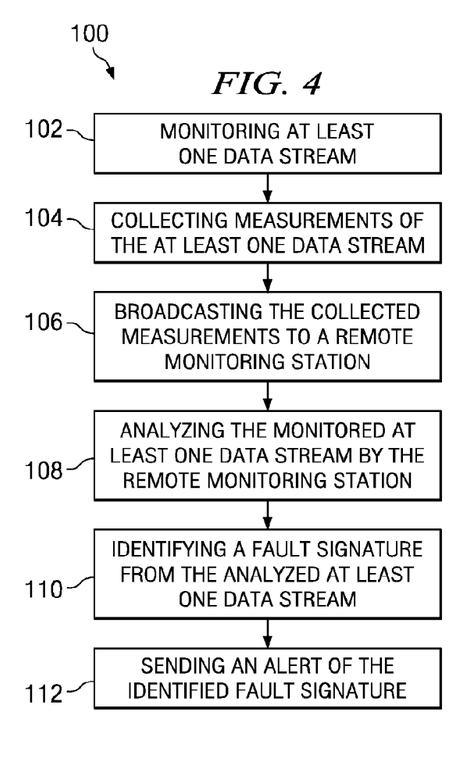
FIG. 4 depicts a first flow diagram of the method in accordance with a preferred embodiment of the present invention.

Referring now to FIG. 4, depicts a first method for integrated IP DSLAM test monitoring 100 in accordance with the preferred embodiment of the invention. A method of internet protocol digital subscriber line asynchronous multiplexer test monitoring that comprises monitoring 102 at least one data stream, collecting 104 measurements of the at least one data stream, and broadcasting 106 the collected measurements to a remote monitoring station, analyzing 108 the monitored at least one data stream by the remote monitoring station, identifying 110 a fault signature from the analyzed at least one data stream, and sending 112 an alert of the identified fault signature. The method is performed by software, hardware, firmware, and/or the combination of software, hardware, and/or firmware.

Figure 5:
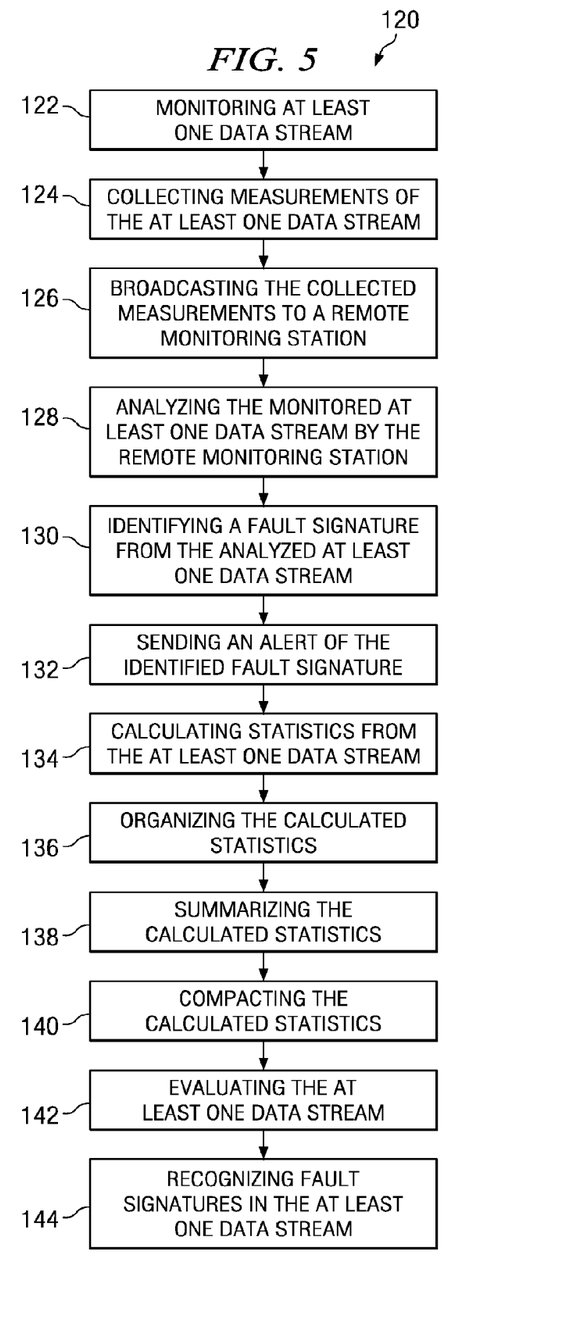
FIG. 5 depicts a second flow diagram of the method in accordance with a preferred embodiment of the present invention.

Referring now to FIG. 5, depicts a second method for integrated IP DSLAM test monitoring 120 in accordance with the preferred embodiment of the invention. A method of internet protocol digital subscriber line asynchronous multiplexer test monitoring that comprises monitoring 122 at least one data stream, collecting 124 measurements of the at least one data stream, broadcasting 126 the collected measurements to a remote monitoring station, analyzing 128 the monitored at least one data stream by the remote monitoring station, identifying 130 a fault signature from the analyzed at least one data stream, and sending 132 an alert of the identified fault signature. The method may also comprise calculating 134 statistics from the at least one data stream, organizing 136 the calculated statistics, summarizing 138 the calculated statistics, compacting 140 the calculated statistics, evaluating 142 the at least one data stream and recognizing 144 fault signatures in the at least one data stream, wherein the at least one data stream is monitored proximate at least one physical port. The method is performed by software, hardware, firmware, and/or the combination of software, hardware, and/or firmware.

Figure 6:
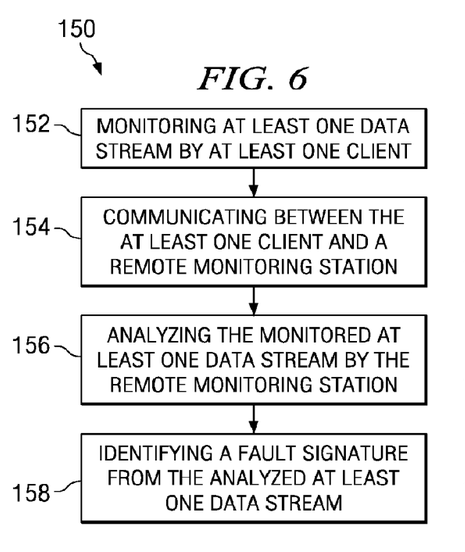
FIG. 6 depicts a first software block accordance with a preferred embodiment of the present invention.

Referring now to FIG. 6, depicts a first software block for integrated IP DSLAM test monitoring 150 in accordance with the preferred embodiment of the invention. A computer readable medium that comprises instructions for, monitoring 152 at least one data stream by at least one client, communicating 154 between the at least one client and a remote monitoring station, analyzing 156 the monitored at least one data stream by the remote monitoring station, and identifying 158 a fault signature from the analyzed at least one data stream. The transfer of information between the processor and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Figure 7:
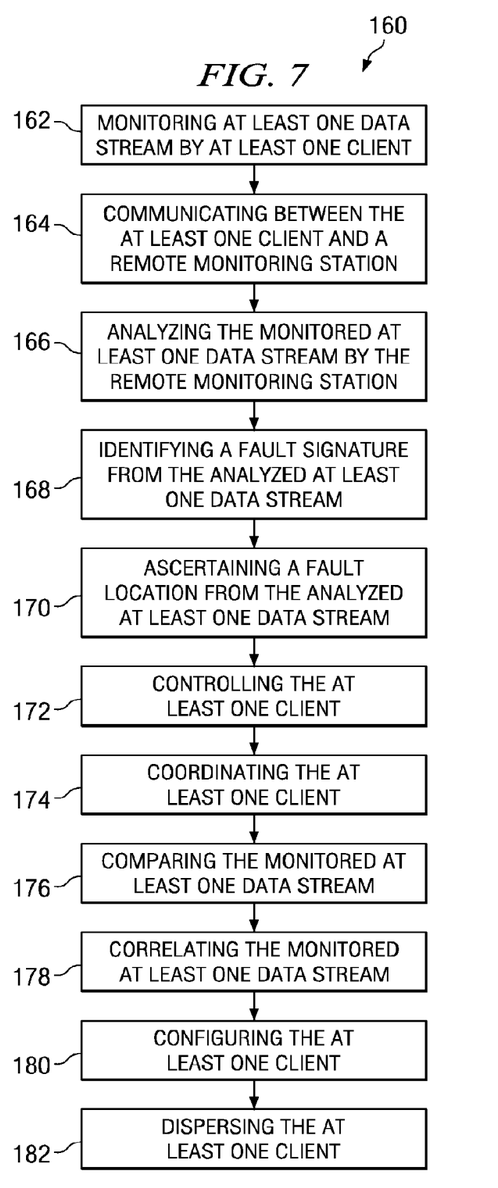
FIG. 7 depicts a second software block in accordance with a preferred embodiment of the present invention.

Referring now to FIG. 7, depicts a second software block for integrated IP DSLAM test monitoring 160 in accordance with the preferred embodiment of the invention. A computer readable medium that comprises instructions for, monitoring 162 at least one data stream by at least one client, communicating 164 between the at least one client and a remote monitoring station, analyzing 166 the monitored at least one data stream by the remote monitoring station, and identifying 168 a fault signature from the analyzed at least one data stream.

The computer readable medium may also comprise instructions for ascertaining 170 a fault location from the analyzed at least one data stream, controlling 172 the at least one client, coordinating 174 the at least one client, comparing 176 the monitored at least one data stream, correlating 178 the monitored at least one data stream, configuring 180 the at least one client and dispersing 182 the at least one client. The transfer of information between the processor and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Figure 8:
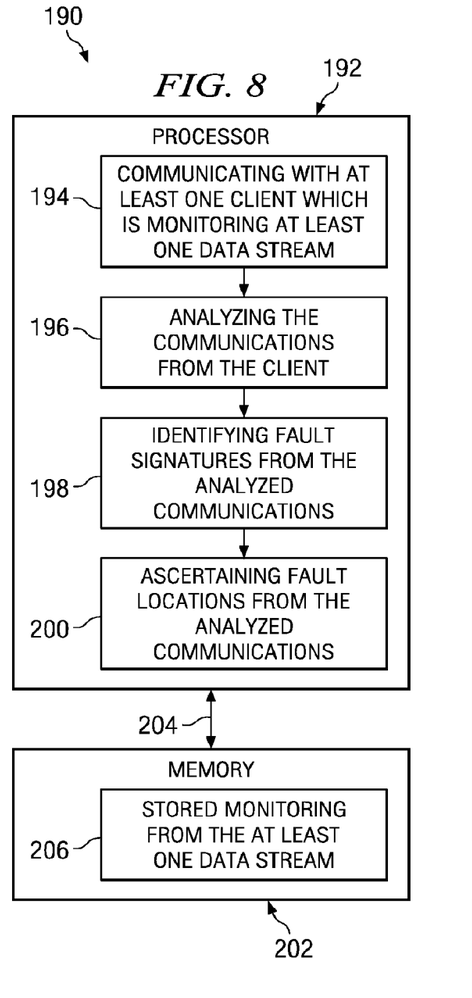
FIG. 8 depicts a fourth system in accordance with a preferred embodiment of the present invention.

Referring now to FIG. 8, depicts a fourth system for integrated IP DSLAM test monitoring 190 in accordance with the preferred embodiment of the invention. A system for internet protocol digital subscriber line asynchronous multiplexer test monitoring that comprises a processor 192 for communicating 194 with at least one client which is monitoring at least one data stream, analyzing 196 the communications from the client, identifying 198 fault signatures from the analyzed communications and ascertaining 200 fault locations from the analyzed communications, and a memory 202 communicably coupled 204 to the processor for storing 206 the monitoring from the at least one data stream. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 9:
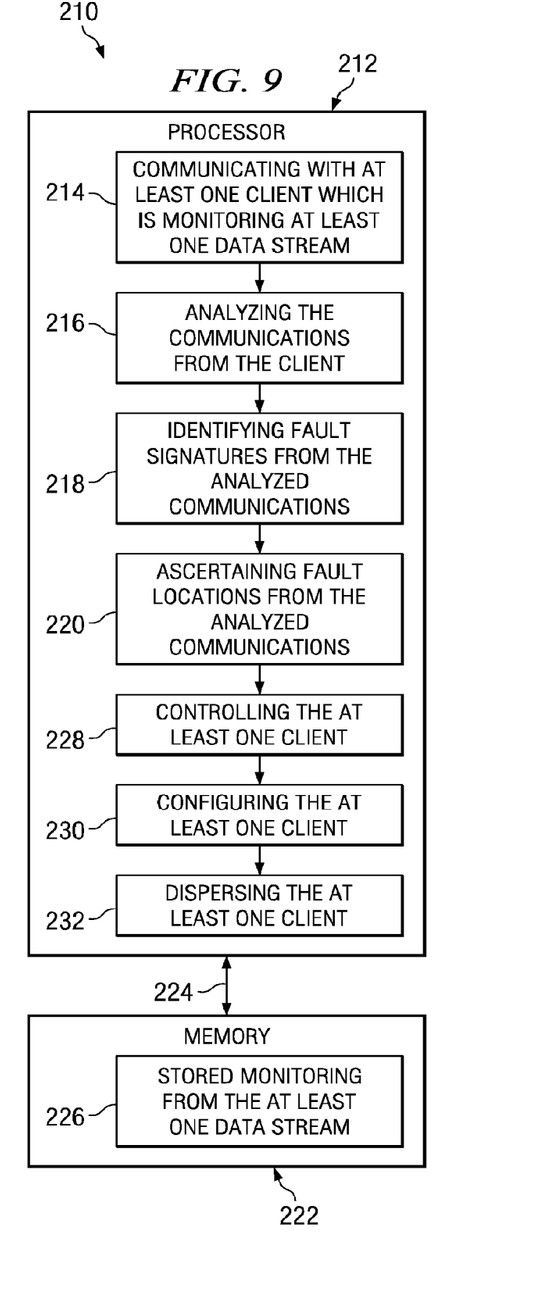
FIG. 9 depicts a fifth system in accordance with a preferred embodiment of the present invention.

Referring now to FIG. 9, depicts a fifth system for integrated IP DSLAM test monitoring 210 in accordance with the preferred embodiment of the invention. A system for internet protocol digital subscriber line asynchronous multiplexer test monitoring that comprises a processor 212 for communicating 214 with at least one client which is monitoring at least one data stream, analyzing 216 the communications from the client, identifying 218 fault signatures from the analyzed communications and ascertaining 220 fault locations from the analyzed communications, and a memory 222 communicably coupled 224 to the processor for storing 226 the monitoring from the at least one data stream. Wherein the processor may control 228 the at least one client, configure 230 the at least one client and disperse 232 the at least one client. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Although the exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the IP DSLAMs and Vsniff clients. Further, although depicted in the particular manner, various blocks may be repositioned without departing from the scope of the current invention. For example, although depicted in the particular manner, the greater or lesser number of DSLAMs and Vsniff clients could be utilized.

What is claimed is:

1. A method of internet protocol digital subscriber line asynchronous multiplexer test monitoring by at least one client, comprising:
   monitoring at least one data stream at one or more interfaces in internet protocol digital subscriber line asynchronous multiplexer, wherein each of the at least one data stream comprises a plurality of data packets;
   collecting measurements of the at least one data stream;
   broadcasting the collected measurements to a remote monitoring station;
   analyzing the monitored at least one data stream by the remote monitoring station, wherein the analyzing comprises comparing the collected measurements from the one or more interfaces;
   identifying a fault signature from the analyzed at least one data stream by the remote monitoring station; and
   sending an alert of the identified fault signature by the remote monitoring station.

2. The method of claim 1 wherein the at least one data stream is monitored by the at least one client proximate at least one physical port.

3. The method of claim 1 comprising:
   calculating statistics from the at least one data stream by the at least one client.

4. The method of claim 3 comprising:
   organizing the calculated statistics by the at least one client.

5. The method of claim 3 comprising:
   summarizing the calculated statistics by the at least one client.

6. The method of claim 3 comprising:
   compacting the calculated statistics by the at least one client.

7. The method of claim 1 comprising:
   evaluating the at least one data stream by the remote monitoring station.

8. The method of claim 1 comprising:
   recognizing fault signatures in the at least one data stream by the remote monitoring station.

9. A non-transitory computer readable medium comprising instructions stored on and executable on a computer comprising:
   monitoring at least one data stream by at least one client at one or more interfaces in internet protocol digital subscriber line asynchronous multiplexer, wherein each of the at least one data stream comprises a plurality of data packets;
   communicating between the at least one client and a remote monitoring station;
   analyzing the monitored at least one data stream by the remote monitoring station, wherein the analyzing comprises comparing the collected measurements from the one or more interfaces;
   identifying a fault signature from the analyzed at least one data stream; and
   sending an alert of the identified fault signature by the remote monitoring station.

10. The non-transitory computer readable medium of claim 9 comprising instructions for:
    ascertaining a fault location from the analyzed at least one data stream.

11. The non-transitory computer readable medium of claim 9 comprising instructions for:
    controlling the at least one client.

12. The non-transitory computer readable medium of claim 9 comprising instructions for:
  coordinating the at least one client.
13. The non-transitory computer readable medium of claim 9 comprising instructions for:
  comparing the monitored at least one data stream.
14. The non-transitory computer readable medium of claim 9 comprising instructions for:
  correlating the monitored at least one data stream.
15. The non-transitory computer readable medium of claim 9 comprising instructions for:
  configuring the at least one client.
16. The non-transitory computer readable medium of claim 9 comprising instructions for:
  dispersing the at least one client.
17. A system for internet protocol digital subscriber line asynchronous multiplexer test monitoring comprising:
  a processor in communication with at least one client which is monitoring at least one data stream comprising a plurality of data packets at one or more interfaces in internet protocol digital subscriber line asynchronous multiplexer, wherein the processor analyzes the communications from the at least one client by comparing the communications between the one or more interfaces, identifies fault signatures from the analyzed communications and ascertains fault locations from the analyzed communications; and
  a memory communicably coupled to the processor, wherein the memory stores the monitoring from the at least one data stream.
18. The system of claim 17 wherein the processor controls the at least one client.
19. The system of claim 17 wherein the processor configures the at least one client.
20. The system of claim 17 wherein the processor disperses the at least one client.

* * * * *